US009313122B2

(12) United States Patent
Miyabe

(10) Patent No.: US 9,313,122 B2
(45) Date of Patent: Apr. 12, 2016

(54) FRAME TRANSMISSION SYSTEM, FRAME TRANSMISSION APPARATUS, AND FRAME TRANSMISSION METHOD

(71) Applicant: FUJITSU LIMITED, Kawasaki-shi, Kanagawa (JP)

(72) Inventor: Masatake Miyabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 474 days.

(21) Appl. No.: 13/801,585

(22) Filed: Mar. 13, 2013

(65) Prior Publication Data

US 2013/0279507 A1 Oct. 24, 2013

(30) Foreign Application Priority Data

Apr. 18, 2012 (JP) ................................. 2012-094880

(51) Int. Cl.
*H04L 12/56* (2006.01)
*H04L 12/803* (2013.01)
*H04L 12/727* (2013.01)
*H04L 12/741* (2013.01)
*H04L 12/26* (2006.01)
*H04L 12/709* (2013.01)

(52) U.S. Cl.
CPC ............ *H04L 45/74* (2013.01); *H04L 43/0852* (2013.01); *H04L 43/10* (2013.01); *H04L 45/245* (2013.01)

(58) Field of Classification Search
CPC ..... H04L 43/0852; H04L 45/74; H04L 1/243; H04L 43/50; H04L 43/00; H04L 45/26; H04L 49/70; H04L 45/245; H04L 47/10; H04L 49/351; H04L 12/66; H04L 45/28; H04J 3/14; H04B 17/0012; H04B 17/028
See application file for complete search history.

(56) References Cited

U.S. PATENT DOCUMENTS 8,274,980 B2 * 9/2012 Sato ...................... H04L 12/413
370/392
8,724,456 B1 * 5/2014 Hong ...................... G06F 11/00
370/225
2007/0058602 A1 * 3/2007 Shimada ................. H04L 12/66
370/340

(Continued)

OTHER PUBLICATIONS

IEEE Standard for Local and metropolitan area networks—Link Aggregation, IEEE Computer Society, Sponsored by the LAN/MAN Standards Committee, pp. 1-145, Nov. 2008.

(Continued)

*Primary Examiner* — Candal Elpenord
(74) *Attorney, Agent, or Firm* — Arent Fox LLP

(57) ABSTRACT

A frame transmission system includes: a first frame transmission apparatus configured to transmit a message frame containing an medium access control (MAC) destination address in an intended user MAC frame, and containing both MAC header information and header information of an upper layer in a user MAC frame; and a second frame transmission apparatus configured to identify one output destination physical link based on the MAC header information and the header information of the upper layer acquired from the message frame, when an output destination with regard to the MAC destination address in the message frame constitutes a link aggregation group including a plurality of physical links, and generate a reply frame containing information on the identified output destination physical link and a MAC address of the second frame transmission apparatus in order to return the reply frame to the first frame transmission apparatus.

20 Claims, 13 Drawing Sheets

(56) References Cited

U.S. PATENT DOCUMENTS

| | | | |
|---|---|---|---|
| 2009/0010254 A1* | 1/2009 | Shimada | H04L 45/245 370/389 |
| 2009/0037713 A1* | 2/2009 | Khalid | H04L 12/4633 713/1 |
| 2011/0188373 A1* | 8/2011 | Saito | H04L 1/24 370/230 |
| 2012/0033665 A1* | 2/2012 | Jacob Da Silva | H04L 45/245 370/389 |
| 2012/0236859 A1* | 9/2012 | Subramanian | H04L 45/245 370/392 |
| 2012/0300773 A1* | 11/2012 | Maeda | H04L 61/103 370/390 |
| 2014/0198793 A1* | 7/2014 | Allu | H04L 45/245 370/392 |

OTHER PUBLICATIONS

Telecom. Standardization Sector of ITU, Series Y: Global Info. Infrastructure, Internet Protocol Aspects and Next-Gen. Networks Internet protocol aspects—Operation, admin. and maintenance OAM functions and mechanisms for Ethernet based networks, pp. 1-72, Feb. 2008.

* cited by examiner

FIG. 13

| RESULT OF HASH CALCULATION OF HEADER IS 1 | PRIORITY: MEDIUM | PHYSICAL LINK #3 |
|---|---|---|
| RESULT OF HASH CALCULATION OF HEADER IS 2 | PRIORITY: MEDIUM | PHYSICAL LINK #4 |
| HEADER MATCH MONITORING FRAME HEADER INFORMATION | PRIORITY: HIGH | PHYSICAL LINK #3 |

FRAME TRANSMISSION SYSTEM, FRAME TRANSMISSION APPARATUS, AND FRAME TRANSMISSION METHOD

CROSS-REFERENCE TO RELATED APPLICATION

This application is based upon and claims the benefit of priority of the prior Japanese Patent Application No. 2012-094880, filed on Apr. 18, 2012, the entire contents of which are incorporated herein by reference.

FIELD

The embodiments discussed herein are related to a frame transmission system that transmits user medium access control (MAC) frames.

BACKGROUND

In recent years, Ethernet (registered trademark) has been used not only for local area networks (LANs) but also in carrier networks, which are an infrastructure technology for supporting packet networks on which transmission target data is transmitted in the form of packets. Ethernet has become used for not only data communications but also communications that are sensitive to transmission delays and data losses in the middle of transmission, such as synchronous messages, sounds, and moving images. Therefore, it has become desirable to provide monitoring of accurate service of quality (QoS) and the functionality of a high degree of classification of faults.

One of technologies for providing such QoS monitoring and fault classification for Ethernet transmission paths is a set of operation administration and maintenance (OAM) functions defined in Recommendation International Telecommunication Union Telecommunication Standardization Sector (ITU-T) Y.1731 (February 2008). Many functions, such as connectivity monitoring, transmission-path checking, fault notification, and monitoring of transmission delay or a frame loss are included in the set of OAM functions.

SUMMARY

According to an aspect of the embodiments discussed herein, a frame transmission system includes: a first frame transmission apparatus configured to transmit a message frame containing an medium access control (MAC) destination address in an intended user MAC frame, and containing both MAC header information and header information of an upper layer in a user MAC frame; and a second frame transmission apparatus configured to identify one output destination physical link based on the MAC header information and the header information of the upper layer acquired from the message frame, when an output destination with regard to the MAC destination address in the message frame constitutes a link aggregation group including a plurality of physical links, and generate a reply frame containing information on the identified output destination physical link and a MAC address of the second frame transmission apparatus in order to return the reply frame to the first frame transmission apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 is a table for explaining a load distribution rule of a load distribution unit of the carrier transmission apparatus (#2) in the second embodiment.

DESCRIPTION OF EMBODIMENTS

Hereinafter, embodiments will be described with reference to the drawings.

While inventing the present embodiments, observations were made regarding a related art. Such observations include the following, for example.

Figure 1:
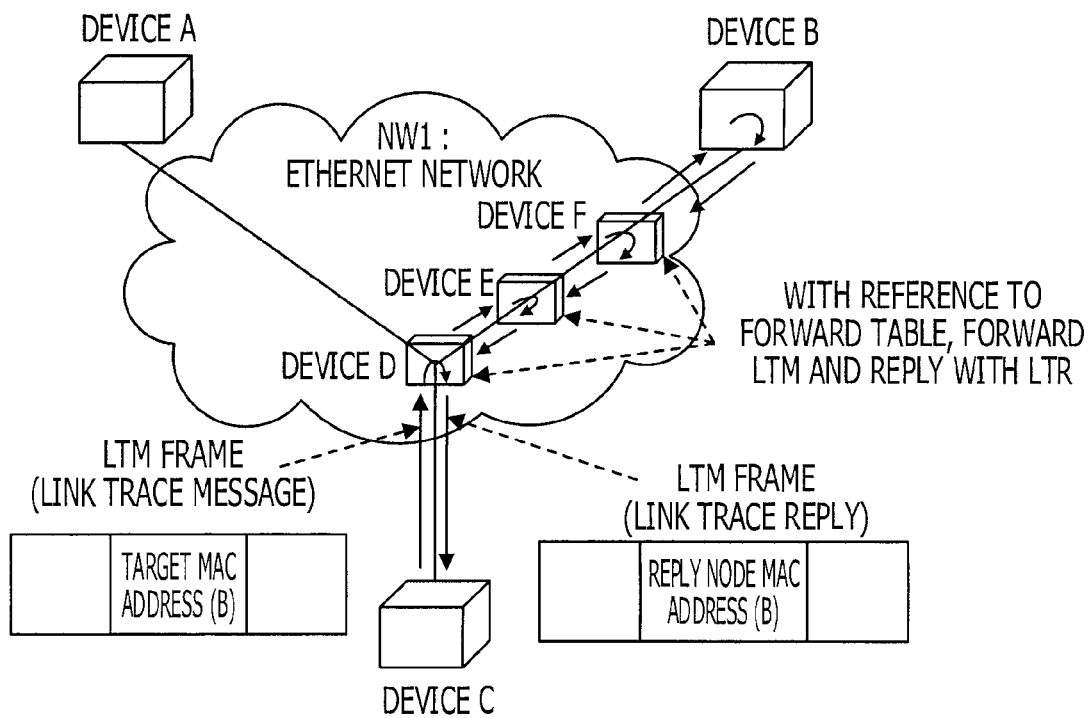
FIG. 1 is an illustration for explaining an example operation of a link trace (Eth-LT) function.

FIG. 1 illustrates a manner in which a link trace (Eth-LT) function among the set of OAM functions operates. With reference to FIG. 1, the case where an Ethernet frame including the MAC address of a device B as a destination address is traced along a transmission path from a device C will be described. Here, devices A, B, and C accommodated in an Ethernet network NW1 are edge devices (layer 2 (L2) switches) of user terminals or a carrier (communication enterprise), or the like, and devices D, E, and F on the Ethernet network NW1 are L2 switches or the like.

The device C generates a link trace message (LTM) frame containing, in the payload thereof, the MAC address of the device B as a target MAC address. An MAC destination address in the MAC header of the LTM frame is a multicast address set specially for a link trace message, and therefore each device that provides a link trace function receives the LTM frame and performs processing.

Upon receiving the LTM frame, the device D extracts the target MAC address out of this frame, and checks a forwarding table. Then, upon recognizing that the device D is to transmit the frame containing a destination address B toward the device E, the device D forwards the LTM frame to the device E.

At the same time, in order to notify the device C of the LTM frame having passed through the device D, the device D returns to the device C a link trace reply (LTR) frame that contains in a payload therein the MAC address of the device D as the MAC address of a reply node. Other devices E and F sequentially perform the same processing as the device D.

Upon arrival of the LTM frame at the device B, the device B returns to the device C an LTR frame containing the MAC address of the device B as the MAC address of a reply node. As a result of these pieces of processing, the MAC addresses of the device D, device E, device F, and device B are collected in the device C. The collected addresses are information on the transmission path of the frame containing the MAC address of the device B as the destination address.

In this way, the Eth-LT function allows collecting information on MAC addresses of devices through which a trace target frame passes. Accordingly, the Eth-LT function is used for applications such as checking a transmission path of service traffic upon occurrence of a fault in the service traffic.

Figure 2:
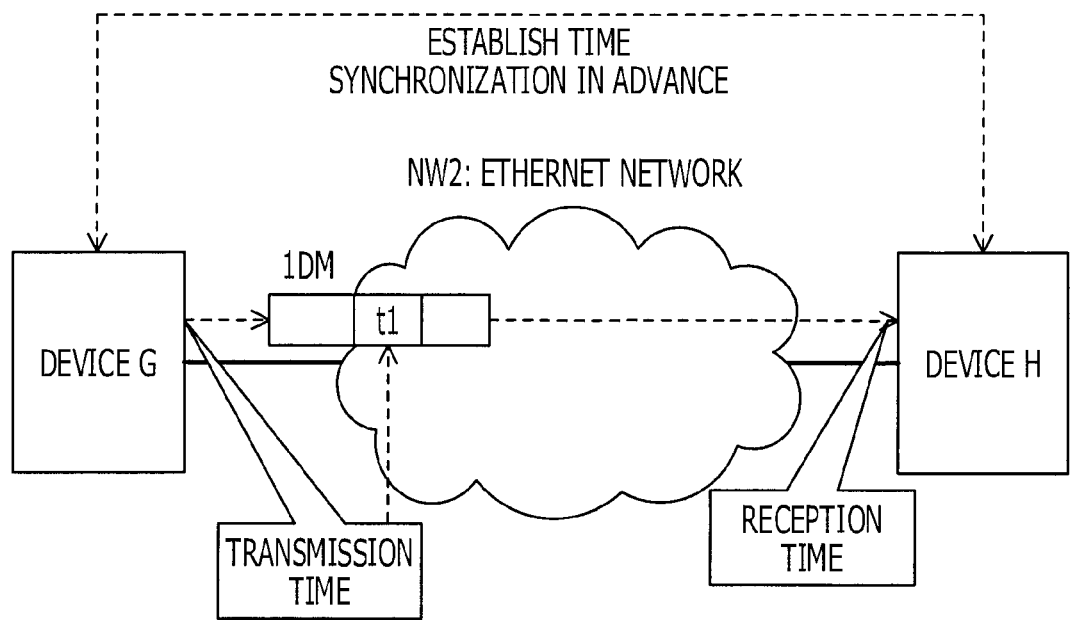
FIG. 2 is an illustration for explaining an example operation of a one-way delay measurement (1 way Eth-DM) function.

FIG. 2 illustrates a manner in which a one-way delay measurement (1 way Eth-DM) function in the set of OAM functions operates. In FIG. 2, a manner in which transmission delay between a device G and a device H is measured for traffic from the device G toward the device H over an Ethernet network NW2 is illustrated. Here, the device G and device H accommodated in the Ethernet network NW2 are L2 switches of user terminals or a carrier, or the like.

It is desirable that clocks in the device G and the device H are synchronized prior to measurement of transmission delay. The time synchronization is implemented by a method of connecting a global positioning system (GPS) receiver to each of the devices G and H and supplying exact time, for example.

The device G transmits a measurement frame called 1DM toward the device H under the condition where the time synchronization is established. In this 1DM frame, a time stamp indicating a transmission time t1 at which the frame is transmitted is contained. Upon receiving the 1DM frame, the device H records a reception time t2 and is able to calculate transmission delay from a difference between the transmission time t1 contained in the received frame and the recorded reception time t2. By measuring transmission delay along specific service traffic, this function is used for applications such as monitoring transmission quality of service traffic.

The aforementioned Eth-LT allows devices on the transmission path through which an LTM frame toward the target MAC address passes to be known. Unfortunately, it is impossible to know a physical link through which a service frame passes, for example, when link aggregation technology (LA) prescribed in Institute Electrical and Electronics Engineers (IEEE) standard 802.1AX (3 Nov. 2008) is utilized between devices. Subsequently, with reference to FIG. 3, this issue will be described in detail.

Figure 3:
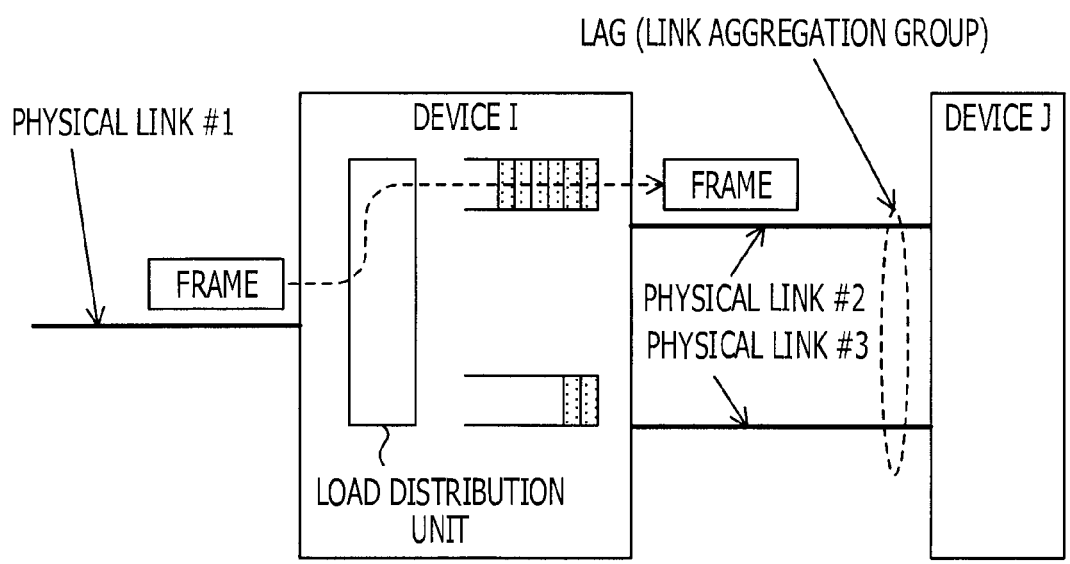
FIG. 3 is an illustration for explaining link aggregation.

FIG. 3 illustrates an overview of operations of link aggregation. Physical links #2 and #3 between a device I and a device J on an Ethernet network (not illustrated) form one link aggregation group (LAG) by using an LA technology, and they are logically used as a single link.

Here, the case where a frame received by the device I on a physical link #1 is forwarded to an LAG formed of the physical links #2 and #3 is considered. In the device I, upon learning that the frame received on the physical link #1 will be forwarded toward the LAG, a load distribution unit determines which physical link of the LAG the frame is to be transmitted to. When a physical link to which the frame is to be transmitted is determined, the frame is transmitted through that physical link.

In cases where Eth-LT is applied to a transmission path configuration including the LAG, since the Eth-LT collects MAC addresses of devices through which a frame passes as mentioned above, it is known that the frame has passed the device I and the device J. In the Eth-LT, however, it is usually impossible to know which of the physical link #2 and physical link #3 a frame of communication that an OAM operator desires to trace has passed through. For example, it is inevitably unknown what communication is affected when the transmission quality of the physical link #2 deteriorates.

Figure 4:
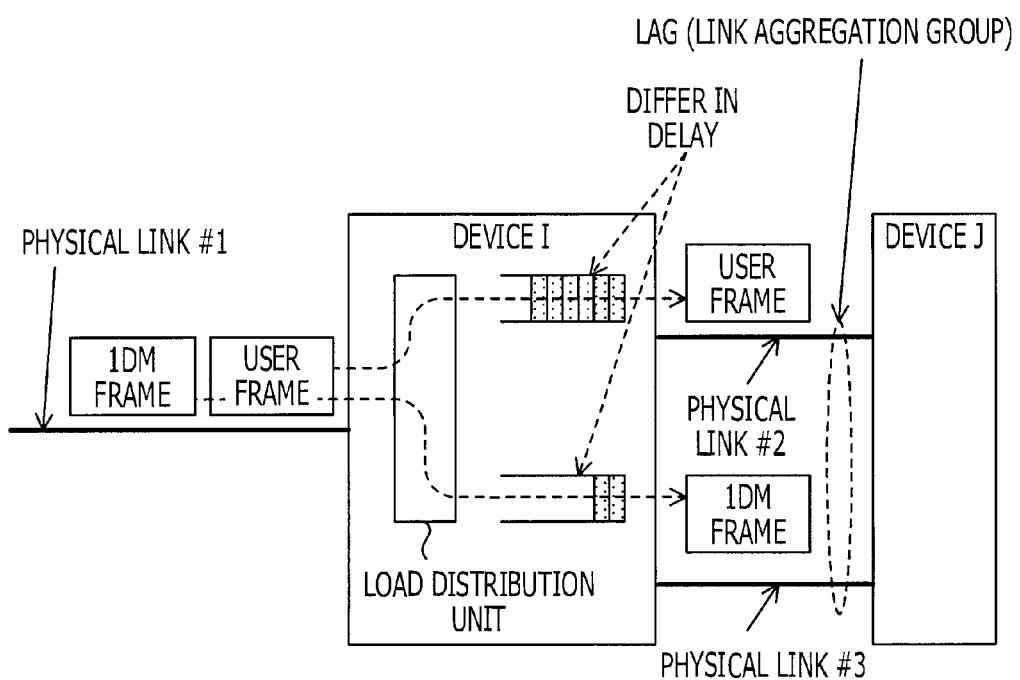
FIG. 4 is an illustration for explaining the relationship between the ink aggregation and one-way delay measurement.

With further reference to FIG. 4, the case where one-way delay measurement is used is considered in order to monitor the transmission quality for a specific user's communication. When it is learned that the frame received by the device I on the physical link #1 will be forwarded to the LAG, which physical link the frame is to be transmitted to is determined by the load distribution unit as mentioned above. At this time, a user frame (a user communication frame or a user MAC frame) and the 1DM frame may be distributed to separate physical links.

This arises from the concrete content of processing of the load distribution unit. The concrete content of processing of the load distribution unit is not defined in IEEE standard 802.1AX (3 Nov. 2008). The physical link of an output destination, however, is determined in many cases from the hash value obtained by performing a hash calculation typically based on the content of the MAC header of a frame or the content of the header of an upper layer protocol contained in the payload. This is for the purpose of inhibiting the order of a row of information transmitted from a specific transmission end to a specific reception end from being reversed by causing the row of information to be transmitted on a single physical link.

A user frame is such a frame as to be headed from a device existing at a user location to another device existing at another user location, and therefore the header information also contains information from a device at a user location toward another device at another user location. In contrast, a 1DM frame is a frame transmitted from one end to another end of a section for which transmission delay is desired to be monitored, and contains header information different from the user frame when used for quality assurance from edge to edge of a carrier network, for example. Therefore, a user frame and a 1DM frame may be transmitted on different physical links, and there is a possibility that it may become impossible to correctly measure the transmission quality of a user's communication whose transmission quality is desired to be monitored.

One problem is to provide a technique that enables a transmission path of a user communication frame to be correctly detected when a link aggregation group including a plurality of physical links is formed.

Another problem is to provide a technique that enables a user communication frame whose transmission quality is desired to be monitored and a monitoring frame for monitoring the transmission quality to pass through the same physical link when a link aggregation group including a plurality of physical links is formed.

First Embodiment

Figure 5:
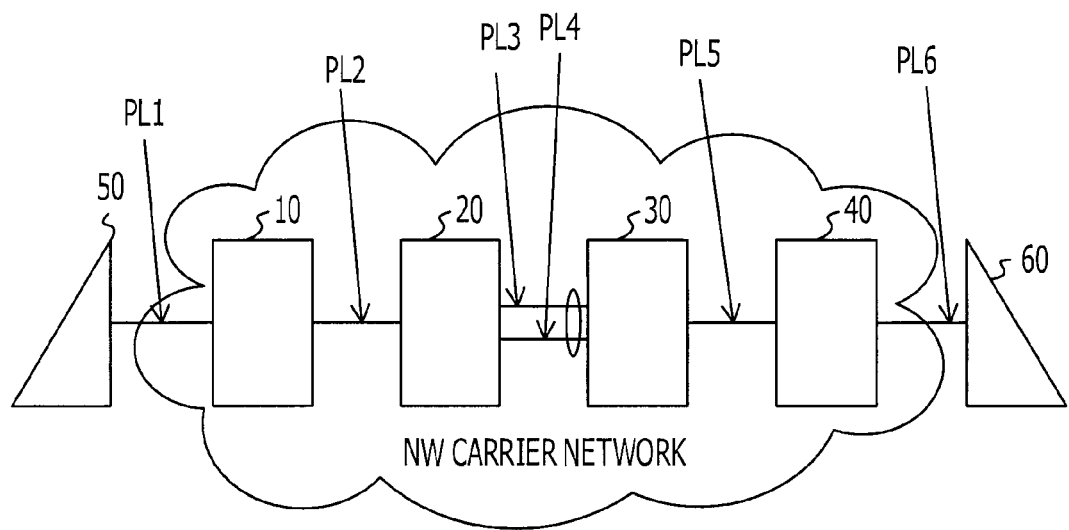
FIG. 5 is a block diagram illustrating a configuration of a frame transmission system of first and second embodiments.

With reference to FIG. 5 illustrating an example system configuration of a first embodiment, in a frame transmission system SYS, four carrier transmission apparatuses (#1, #2,

3, and #4) 10, 20, 30, and 40 are arranged in a carrier network NW that is operated by a carrier. User devices (A and B) 50 and 60, which are user terminals, are accommodated in the carrier network NW. Here, the carrier network NW is an Ethernet network, and the carrier transmission apparatuses 10, 20, 30, and 40 are frame transmission apparatuses, such as layer 2 (L2) switches. Each hardware configuration of the User devices 50 and 60, and the carrier transmission apparatuses 10, 20, 30, and 40 may include, for example, a processor and a memory storing a program executed by the processor.

The carrier transmission apparatuses 10, 20, 30, and 40 transmit (including forwarding and exchanging) user communication frames of service traffic flowing through six physical links (#1, #2, #3, #4, #5, and #6) PL1, PL2, PL3, PL4, PL5, and PL6 between the user device (A) 50 and the user device (B) 60. The carrier transmission apparatus (#2) 20 and the carrier transmission apparatus (#3) 30 are connected by two physical links, the physical link (#3) PL3 and the physical link (#4) PL4, that constitute a link aggregation group (LAG). Each of the physical links PL1 to PL6 constitutes a bidirectional transmission path.

Figure 6:
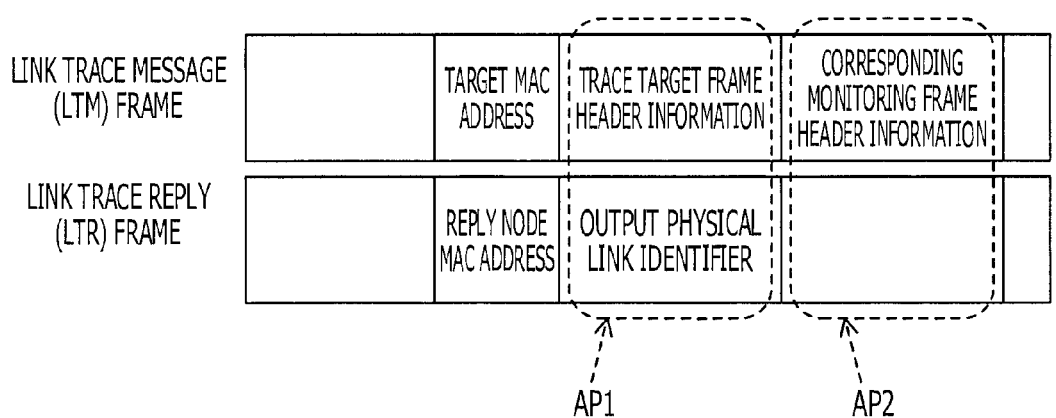
FIG. 6 illustrates configurations of an LTM frame and an LTR frame in the first and second embodiments.

In the frame transmission system SYS adopting a configuration mentioned above, each carrier transmission apparatus generates a link trace message (LTM) frame in a format illustrated in FIG. 6 in accordance with the necessity for transmission in order to correctly know information about physical links for a transmission path through which a specific user communication frame passes. The generated LTM frame takes an expanded form of the link trace message frame defined in the above-mentioned ITU-T Recommendation.

Figure 7:
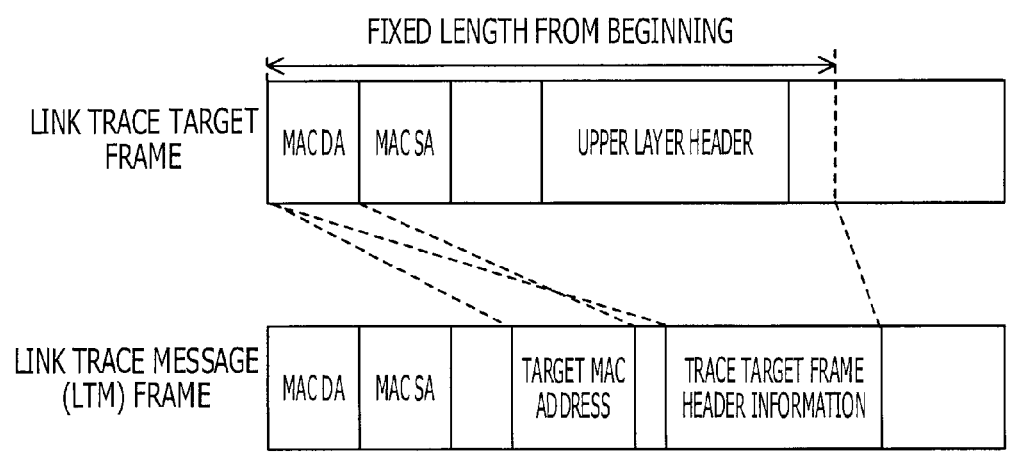
FIG. 7 is an illustration for explaining the relationship between a link trace target frame and the LTM frame in the first embodiment.

This LTM frame contains, in the payload following the MAC header, not only a target MAC address but also both MAC header information and header information of an upper layer of a user communication frame for link tracing (link trace target frame), that is, trace target frame header information (refer to FIG. 7 for more details).

A carrier transmission apparatus (the carrier transmission apparatus (#2) 20 here) that has received the LTM frame containing these pieces of information is able to know, based on information on the target MAC address and the content of the forwarding table, that the user communication frame of the link trace target frame containing, in the MAC header thereof, a MAC destination address (MAC DA) corresponding to the target MAC address will be forwarded to an LAG.

Thereby, this carrier transmission apparatus takes out the trace target frame header information from the LTM frame and identifies one physical link from the LAG by the same processing procedure (algorithm) as used in the load distribution unit of this apparatus.

This carrier transmission apparatus returns a link trace reply (LTR) frame containing in the payload thereof an identifier representing the identified output destination physical link (an output physical link identifier), together with the MAC address of a reply node. This enables a carrier transmission apparatus (the carrier transmission apparatus (#1) 10 here) at a link trace message source node to detect, based on the LTR frame, which physical link the user communication frame of the link trace target passes through. This LTM frame takes an expanded form of the link trace message frame defined in the above-mentioned ITU-T Recommendation.

As mentioned above, in the formats of the LTM frame and the LTR frame illustrated in FIG. 6, an additional portion AP1 including the trace target frame header information and the output physical link identifier is additional information desired for correctly detecting information about a physical link corresponding to the transmission path through which a specific user communication frame passes.

Note that, in the format of the LTM frame illustrated in FIG. 6, an additional portion AP2 including the corresponding monitoring frame header information is additional information that is preferably further added in addition to the additional portion AP1 in order to enable a specific user communication frame and the monitoring frame to pass along the same transmission path. A detailed description will be given of this in the frame transmission system SYS of a second embodiment.

In the frame transmission system SYS of this first embodiment, the case is considered where an LTM frame is transmitted from the carrier transmission apparatus (#1) 10 in order for the transmission path of a user communication frame of service traffic in the carrier network NW to be investigated in response to a communication fault investigation request from a user who uses the user device (A) 50.

Figure 8:
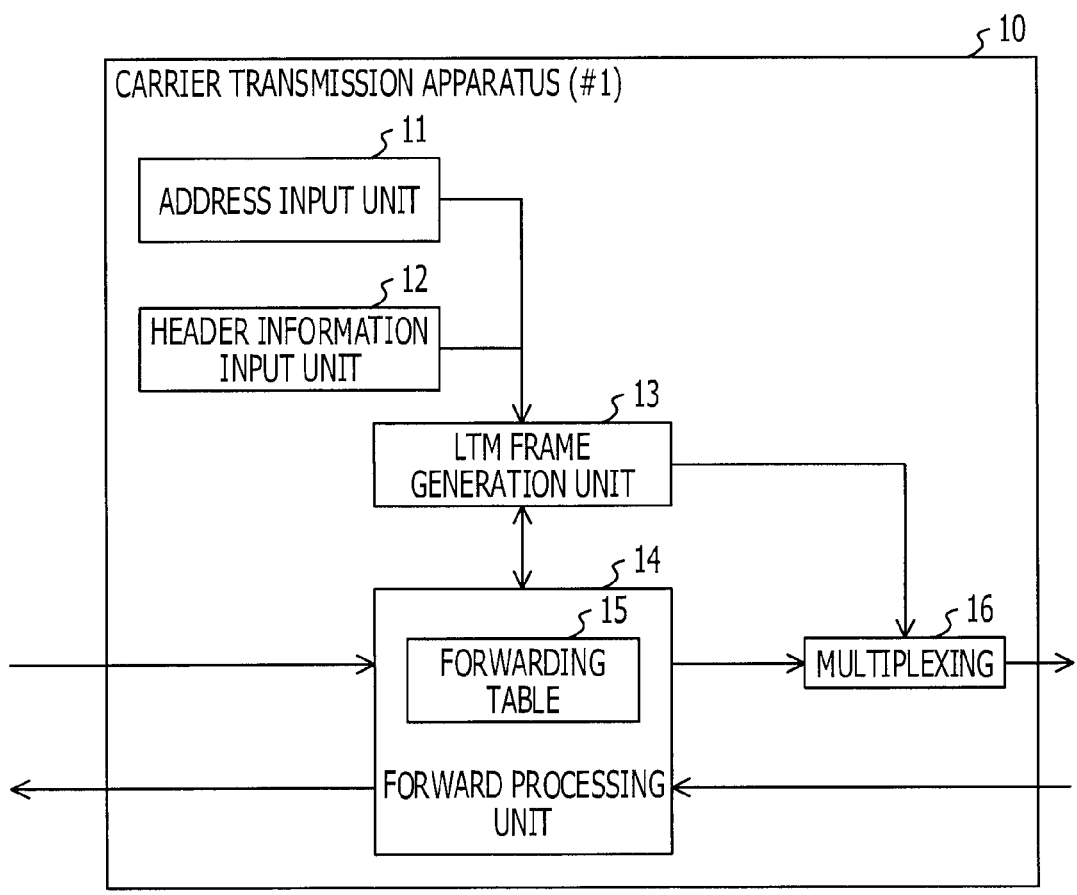
FIG. 8 is a block diagram illustrating a configuration of a carrier transmission apparatus (#1) in the first embodiment.

FIG. 8 illustrates a detailed configuration of the carrier transmission apparatus (#1) 10 corresponding to an entrance edge node of the carrier network NW in the frame transmission system SYS illustrated in FIG. 5.

The carrier transmission apparatus 10 is connected through the physical link PL1 to the user device (A) 50 and is connected through the physical link PL2 to the carrier transmission apparatus (#2) 20, and includes an address input unit 11, a header information input unit 12, an LTM frame generation unit 13, a forward processing unit 14, a forwarding table 15, and a multiplexing unit 16. Each function of the address input unit 11, the header information input unit 12, the LTM frame generation unit 13, the forward processing unit 14, and the multiplexing unit 16 may be performed, for example, by a processor executing a program stored in a memory. And, the forwarding table 15 may be implemented as hardware, for example, by a memory.

With an instruction to the frame transmission system SYS from the outside (an OAM operator here) as an impetus, in the carrier transmission apparatus 10, the LTM frame generation unit 13 is activated in order to investigate the transmission path within the carrier network NW of service traffic from the user device (A) 50 toward the user device (B) 60.

Usually, the user communication frame of the link trace target, that is, the link trace target frame that is received from the user device 50 and forwarded through the forward processing unit 14 contains, in the MAC header thereof, MAC header information such as a MAC destination address (MAC DA) and a MAC source address (MAC SA) as illustrated in FIG. 7. Here, a MAC address B of the user device 60 is set as the MAC destination address, and a MAC address A of the user device 50 is set as the MAC source address. The link trace target frame contains header information (e.g., Internet protocol (IP) header information) of an upper layer in the payload that follows the MAC header.

The activated LTM frame generation unit 13, in collaboration with the address input unit 11 and the header information input unit 12, generates an LTM frame of a link trace message illustrated in FIG. 7. That is, the address input unit 11 inputs to the LTM frame generation unit 13 the MAC destination address B corresponding to the link trace target frame input by an OAM operator, as a target MAC Address of the LTM frame. The header information input unit 12 inputs to the LTM frame generation unit 13 header information having a fixed length (e.g., about 60 bytes) from the beginning containing MAC header information corresponding to the link trace target frame input by the OAM operator and header information of an upper layer, as trace target frame header information of the LTM frame.

The LTM frame generation unit 13 stores the target MAC address from the address input unit 11 and the trace target frame header information from the header information input unit 12 in given fields of the payload, and generates an LTM frame that contains, in the MAC header thereof, a MAC destination address and a MAC source address. Here, the MAC destination address of the MAC header in the LTM frame is a multicast address specially set for a link trace message, and the MAC source address is the MAC address of the carrier transmission apparatus 10.

The LTM frame generation unit 13 identifies a physical link of the output destination corresponding to this target MAC address with reference to the forwarding table 15 of the forward processing unit 14, and transmits the LTM frame through the multiplexing unit 16 to the identified physical link (the physical link PL2 here). The multiplexing unit 16 multiplexes the LTM frame from the LTM frame generation unit 13 and the user communication frame from the forward processing unit 14.

In the carrier transmission apparatus 10, when LTR frames of link trace replies are returned from the carrier transmission apparatuses 20, 30, and 40 at nodes on and after the next stage, which are transmission destinations (forward destinations) of the LTM frame, the forward processing unit 14 is able to collect the MAC addresses of the carrier transmission apparatuses 20, 30, and 40 and the output physical link identifier of an LAG, as information on the transmission path of the user communication frame of the link trace target containing the MAC address of the user device (B) 60 as a MAC destination address.

Figure 9:
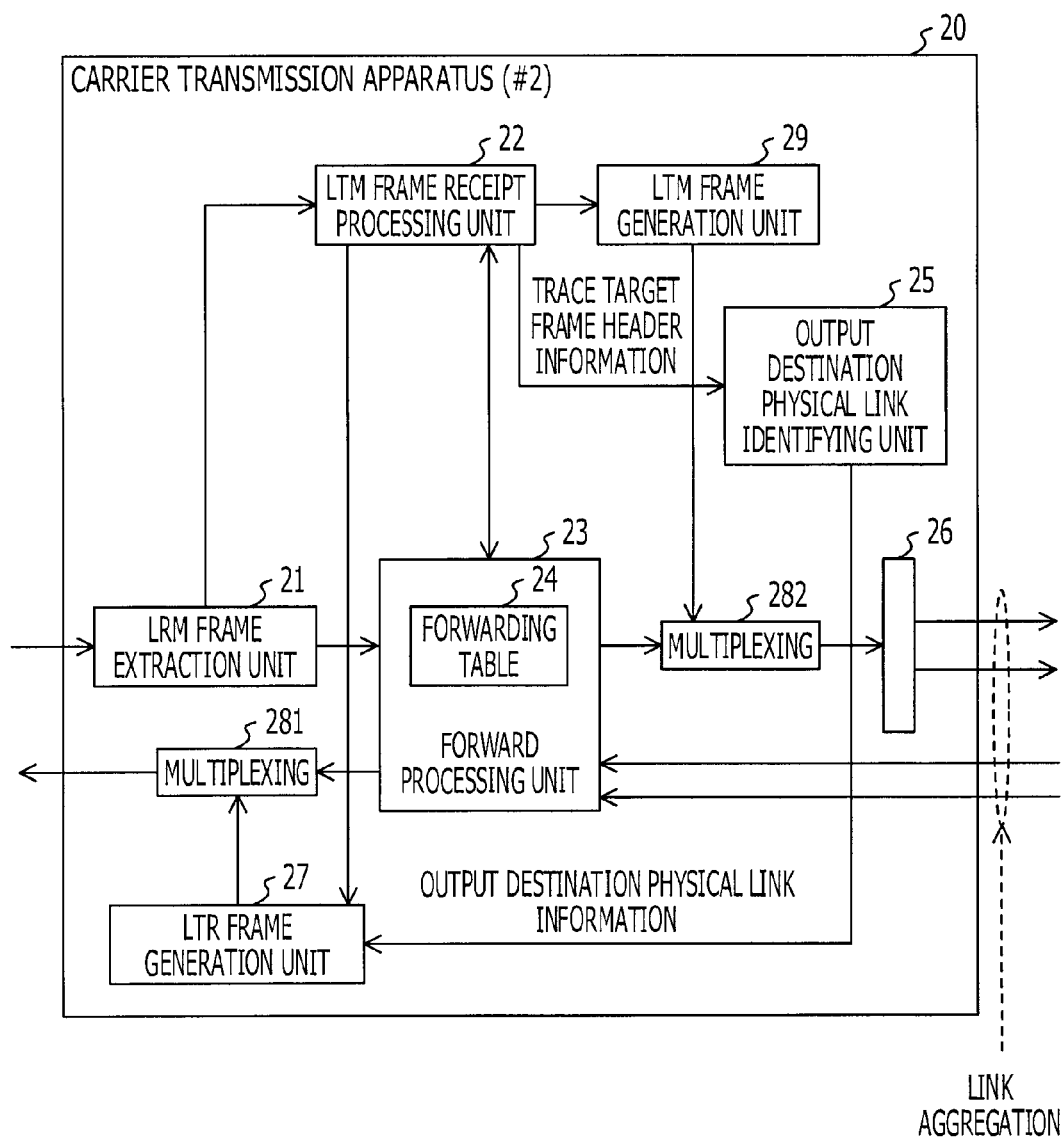
FIG. 9 is a block diagram illustrating a configuration of a carrier transmission apparatus (#2) in the first embodiment.

FIG. 9 illustrates a detailed configuration of the carrier transmission apparatus (#2) 20 corresponding to a relay node of the carrier network NW in the frame transmission system SYS illustrated in FIG. 5.

The carrier transmission apparatus 20 is connected through the physical link PL2 to the carrier transmission apparatus (#1) 10 and is connected through the physical links PL3 and PL4 of the LAG to the carrier transmission apparatus (#3) 30, and includes an LTM frame extraction unit 21, an LTM frame receipt processing unit 22, a forward processing unit 23, a forwarding table 24, an output destination physical link identifying unit 25, a load distribution unit 26, an LTR frame generation unit 27, multiplexing units 281 and 282, and an LTM frame generation unit 29. Each function of the LTM frame extraction unit 21, the LTM frame receipt processing unit 22, the forward processing unit 23, the output destination physical link identifying unit 25, the load distribution unit 26, the LTR frame generation unit 27, the multiplexing units 281 and 282, and the LTM frame generation unit 29 may be performed, for example, by a processor executing a program stored in a memory. And, the forwarding table 24 may be implemented as hardware, for example, by a memory.

In this carrier transmission apparatus 20, the LTM frame extraction unit 21 extracts an LTM frame based on a multicast address specially set for a link trace message in a frame received through the physical link PL2 from the transmission apparatus 10, and then transmits the extracted LTM frame to the LTM frame receipt processing unit 22.

Referring to the forwarding table 24 of the forward processing unit 23, the LTM frame receipt processing unit 22 searches for a forward destination (output destination) for the target MAC address carried in the received LTM frame. If, as a result of this search, it is determined that the route to the output destination passes through an LAG, the LTM frame receipt processing unit 22 takes out trace target frame header information from the received LTM frame and transmits it to the output destination physical link identifying unit 25.

Using the same algorithm as the load distribution unit 26, the output destination physical link identifying unit 25 identifies one output destination physical link over which a frame containing in the frame top portion the same information as the trace target frame header information is to be forwarded. Then, the output destination physical link identifying unit 25 transmits information on the identified output destination physical link to the LTR frame generation unit 27.

The LTR frame generation unit 27 is notified from the LTM frame receipt processing unit 22 that the LTM frame has been received, and receives the output destination physical link information from the output destination physical link identifying unit 25. Taking these opportunities, the LTR frame generation unit 27 generates an LTR frame that contains in the payload thereof an identifier of the output destination physical link (e.g., an identifier corresponding to the physical link (#3) PL3) and a reply node MAC address (the MAC address of the carrier transmission apparatus 20 here) and contains in the MAC header thereof a MAC destination address (the MAC address of the carrier transmission apparatus 10 here) and a MAC source address (the MAC address of the carrier transmission apparatus 20 here).

The generated LTR frame is transmitted (returned) through the multiplexing unit 281 over the physical link PL2 to the carrier transmission apparatus 10, which is the transmission source of the LTM frame.

The LTM frame generation unit 29 outputs to the multiplexing unit 282 the LTM frame that has been received from the LTM frame receipt processing unit 22 and in which the MAC source address of the MAC header has been rewritten into the MAC address of the carrier transmission apparatus 20, in order to transmit that LTM frame to the LAG, which is the forward destination corresponding to the target MAC address. The LTM frame from the multiplexing unit 282 is transmitted to the physical link PL3 identified based on the algorithm used in the load distribution unit 26.

The carrier transmission apparatus (#3) 30 serving as a relay node and the carrier transmission apparatus (#4) 40 serving as an exit edge node, which are each disposed downstream of the carrier transmission apparatus (#2) 20 in the carrier network NW, may be configured to have a function of processing a received LTM frame and returning an LTR frame through an upstream node to the carrier transmission apparatus (#1) 10, which is a node that has generated the LTM frame at the beginning.

Through the processes described above, the carrier transmission apparatus (#1) 10 is notified that the user communication frame of the link trace target is transmitted through the carrier transmission apparatuses (#2, #3, and #4) 20, 30, and 40, and that which physical link the user communication frame passes through between the carrier transmission apparatus (#2) 20 and the carrier transmission apparatus (#3) 30 where the LAG is formed. Accordingly, upon occurrence of a fault in service traffic, the carrier transmission apparatus 10 may accurately keep track of the transmission path of the user communication frame of the service traffic.

Second Embodiment

An example system configuration of a second embodiment has the same configuration as the frame transmission system SYS of the first embodiment that has been described with reference to FIG. 5.

In order to accurately monitor transmission quality (transmission delay here) of a specific user communication frame in the frame transmission system SYS of the second embodiment, a user communication frame whose transmission delay is to be monitored (delay monitoring target frame) and a monitoring frame for measuring transmission delay (delay monitoring frame) preferably pass along the same transmission path.

Each carrier transmission apparatus generates a link trace message (LTM) frame in a format illustrated in FIG. 6 as the necessity for transmission arises in order to specify that the user communication frame of the delay monitoring target and the delay monitoring frame pass along the same transmission path. The generated LTM frame takes an expanded form of the link trace message frame defined in the above-mentioned ITU-T Recommendation.

This LTM frame contains, in the payload following the MAC header, not only a target MAC address but also both MAC header information and header information of an upper layer of the user communication frame of the delay monitoring target (delay monitoring target frame), that is, trace target frame header information. This LTM frame further contains both MAC header information of the delay monitoring (1DM) frame and one-way delay measurement protocol data unit (1DM PDU), that is, the corresponding monitoring frame header information (refer to FIG. 10 for more details).

A carrier transmission apparatus (the carrier transmission apparatus (#2) 20 here) that has received the LTM frame containing these pieces of information is able to know, based on information on the target MAC address and the content of the forwarding table, that the user communication frame of the delay monitoring target frame containing, in the MAC header thereof, a MAC destination address (MAC DA) corresponding to the target MAC address will be forwarded to an LAG.

Thereby, this carrier transmission apparatus takes out the trace target frame header information from the LTM frame and identifies one physical link from the LAG by the same processing procedure (algorithm) as used in the load distribution unit of this apparatus. This carrier transmission apparatus also additionally sets, to the load distribution unit, a new load distribution rule based on output destination physical link information and the corresponding monitoring frame header information so as to control the user communication frame of the delay monitoring target and the delay monitoring frame so that they pass along the same transmission path.

As mentioned above, in the format of the LTM frame illustrated in FIG. 6, the additional portion AP2 including the corresponding monitoring frame header information is additional information that is preferably further added in addition to the additional portion AP1 in order to enable the user communication frame of the delay monitoring target and the delay monitoring frame to pass along the same transmission path.

In the frame transmission system SYS of this second embodiment, the case is considered where both the delay monitoring (1DM) frame and the user communication frame of the delay monitoring target are instructed to pass through the same physical link even when an LAG exists in order for the delay of the user communication frame of service traffic in the carrier network NW to be monitored in response to a communication fault investigation request from a user who uses the user device (A) 50.

Figure 11:
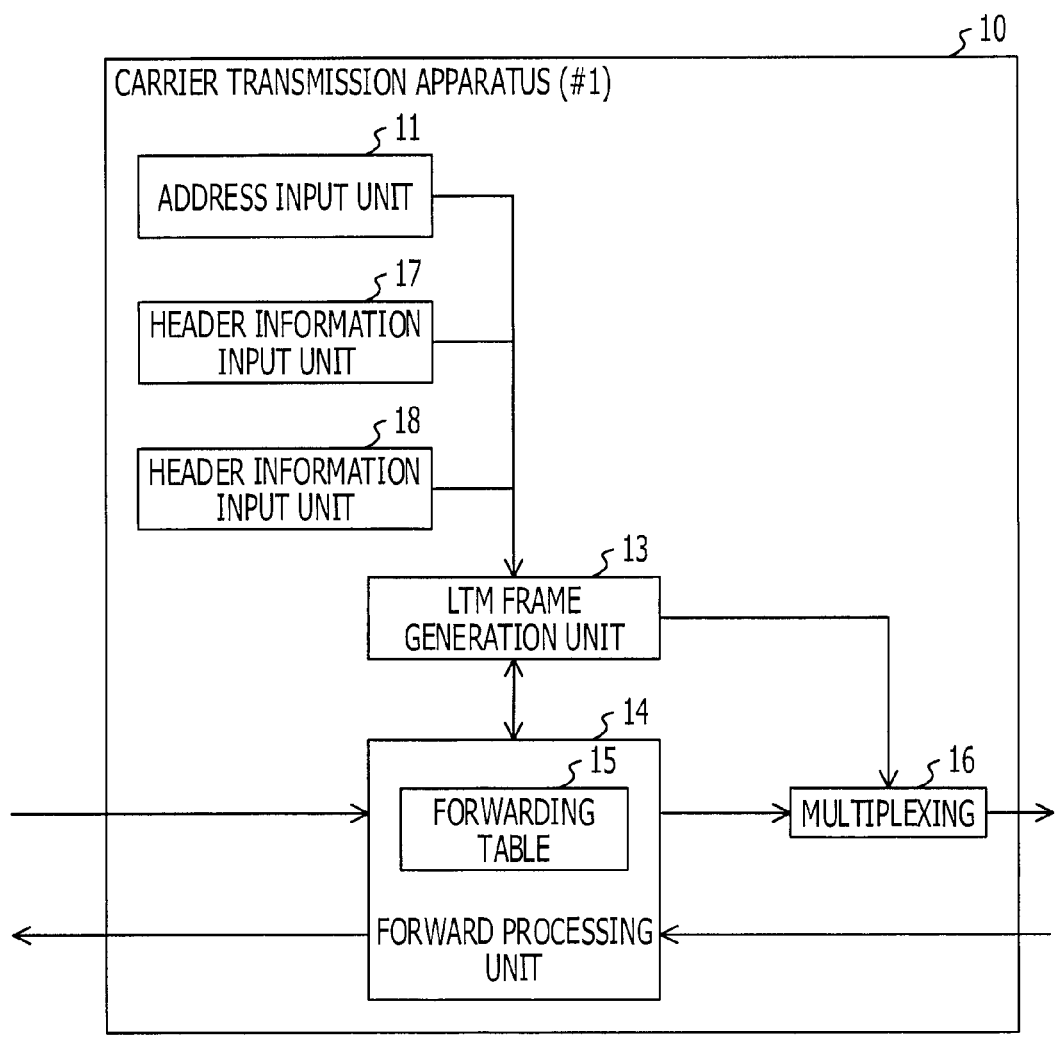
FIG. 11 is a block diagram illustrating a configuration of the carrier transmission apparatus (#1) in the second embodiment.

FIG. 11 illustrates a detailed configuration of the carrier transmission apparatus (#1) 10 corresponding to an entrance edge node of the carrier network NW in the frame transmission system SYS of the second embodiment.

The carrier transmission apparatus 10 is connected through the physical link PL1 to the user device (A) 50 and is connected through the physical link PL2 to the carrier transmission apparatus (#2) 20, and includes the address input unit 11, a header information input unit 17, a header information input unit 18, the LTM frame generation unit 13, the forward processing unit 14, the forwarding table 15, and the multiplexing unit 16. Each function of the address input unit 11, the header information input unit 17, the header information input unit 18, the LTM frame generation unit 13, the forward processing unit 14, and the multiplexing unit 16 may be performed, for example, by a processor executing a program stored in a memory. And, the forwarding table 15 may be implemented as hardware, for example, by a memory.

With an instruction to the frame transmission system SYS from the outside (e.g., an OAM operator) as an impetus, in the carrier transmission apparatus 10, the LTM frame generation unit 13 is activated in order to investigate transmission delay within the carrier network NW of service traffic from the user device (A) 50 toward the user device (B) 60.

Figure 10:
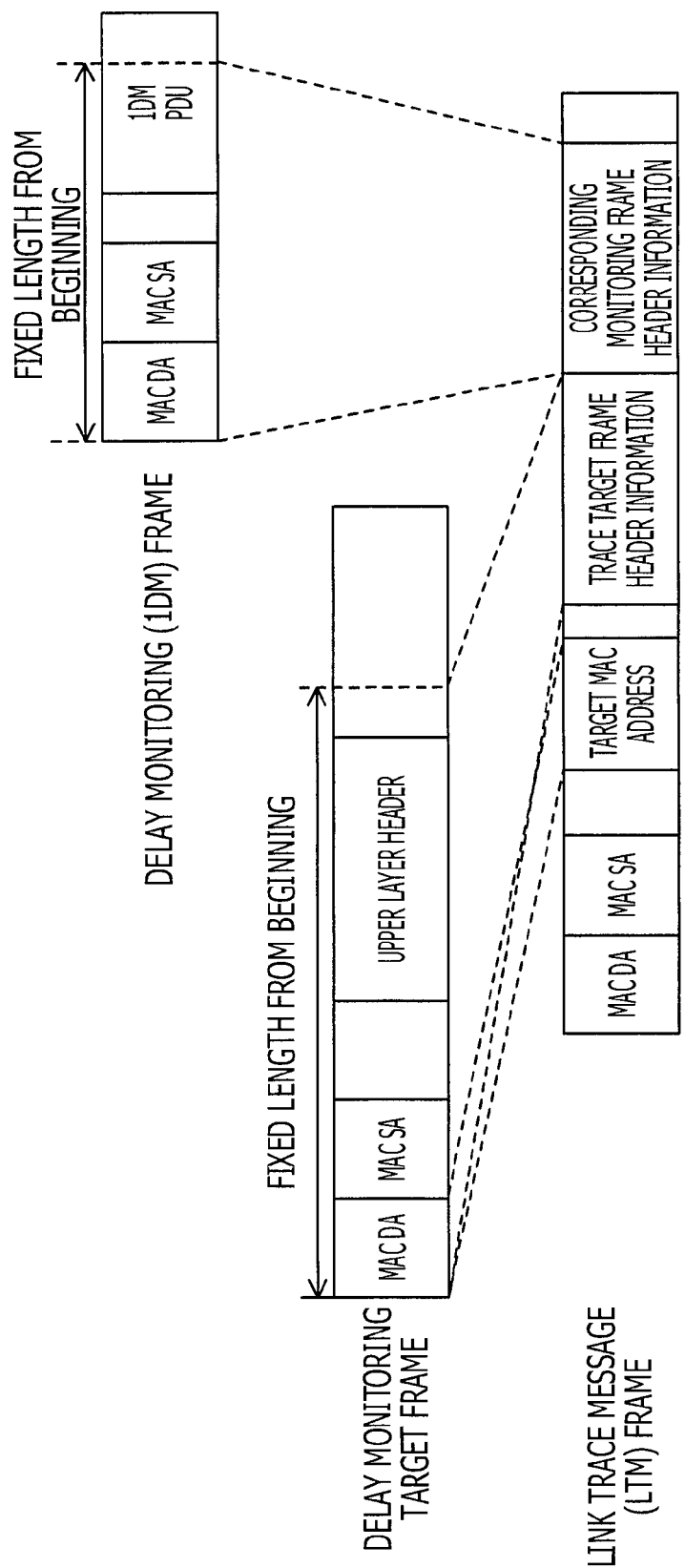
FIG. 10 is an illustration for explaining the relationship among a delay monitoring target frame, a delay monitoring frame, and the LTM frame in the second embodiment.

Usually, the user communication frame of the delay monitoring target, that is, the delay monitoring target frame that is received from the user device 50 and forwarded through the forward processing unit 14 contains, in the MAC header thereof, MAC header information such as a MAC destination address (MAC DA) and a MAC source address (MAC SA) as illustrated in FIG. 10. Here, a MAC address B of the user device 60 is set as the MAC destination address, and a MAC address A of the user device 50 is set as the MAC source address. The delay monitoring target frame contains header information (e.g., IP header information) of an upper layer in the payload that follows the MAC header.

In collaboration with the address input unit 11, the header information input unit 17, and the header information input unit 18, the activated LTM frame generation unit 13 generates an LTM frame of a link trace message illustrated in FIG. 10. That is, the address input unit 11 inputs to the LTM frame generation unit 13 the MAC destination address B corresponding to the delay monitoring target frame input by an OAM operator, as a target MAC Address of the LTM frame.

Also, the header information input unit 17 inputs to the LTM frame generation unit 13 header information having a fixed length (e.g., about 60 bytes) from the beginning that contains MAC header information corresponding to the delay monitoring target frame input by the OAM operator and header information of an upper layer, as the trace target frame header information of the LTM frame.

Furthermore, the header information input unit 18 inputs to the LTM frame generation unit 13 header information having a fixed length (e.g., about 60 bytes) from the beginning that contains MAC header information corresponding to the delay monitoring target frame input by the OAM operator and 1DM PDU, as the corresponding monitoring frame header information of the LTM frame. This MAC header information includes a MAC destination address (the MAC address of the carrier transmission apparatus (#4) 40 here), and a MAC source address (the MAC address of carrier transmission apparatus (#1) 10 here). The 1DM PDU contains a time stamp indicating a frame transmission time as data for transmission quality monitoring.

The LTM frame generation unit 13 stores the target MAC address from the address input unit 11, the trace target frame header information from the header information input unit 17, and the corresponding monitoring frame header information from the header information input unit 18 in given fields of the payload, and generates an LTM frame that contains, in the MAC header thereof, a MAC destination address and a MAC source address. Here, the MAC destination address of the MAC header in the LTM frame is a multicast address specially set for a link trace message, and the MAC source address is the MAC address of the carrier transmission apparatus 10.

The LTM frame generation unit 13 identifies a physical link of the output destination corresponding to this target MAC address with reference to the forwarding table 15 of the forward processing unit 14, and transmits the LTM frame through the multiplexing unit 16 to the identified physical link (the physical link PL2 here). The multiplexing unit 16 multiplexes the LTM frame from the LTM frame generation unit 13 and the user communication frame and the delay monitoring frame from the forward processing unit 14.

In the carrier transmission apparatus 10, when LTR frames of link trace replies are returned from the carrier transmission apparatuses 20, 30, and 40 at nodes on and after the next stage, which are transmission destinations (forward destinations) of the LTM frame, the forward processing unit 14 is able to collect the MAC addresses of the carrier transmission apparatuses 20, 30, and 40 and the output physical link identifier of an LAG, as information on the transmission path of the user communication frame of the link trace target containing the MAC address of the user device (B) 60 as a MAC destination address.

Figure 12:
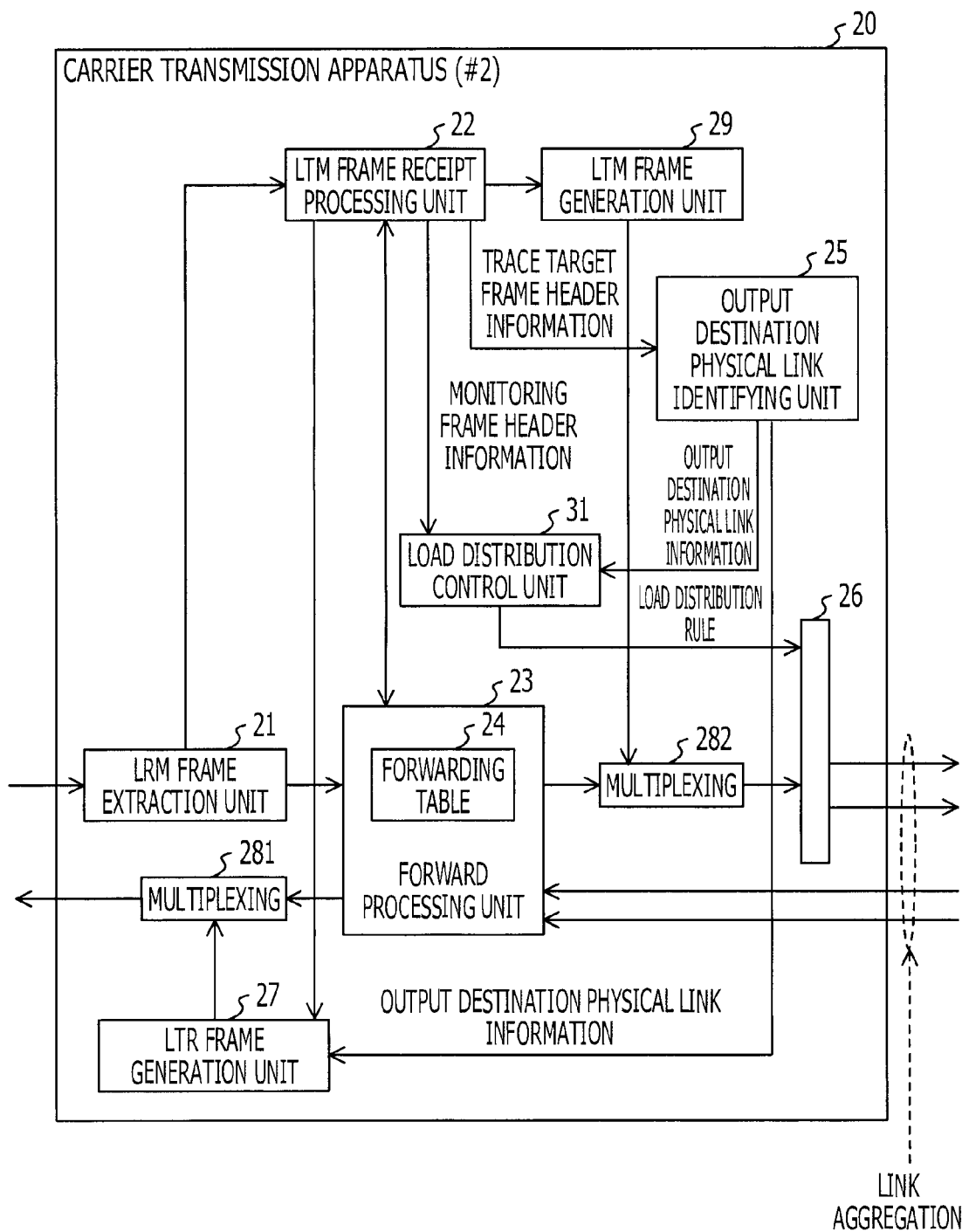
FIG. 12 is a block diagram illustrating a configuration of the carrier transmission apparatus (#2) in the second embodiment.

FIG. 12 illustrates a detailed configuration of the carrier transmission apparatus (#2) 20 corresponding to a relay node of the carrier network NW in the frame transmission system SYS of the second embodiment.

The carrier transmission apparatus 20 is connected through the physical link PL2 to the carrier transmission apparatus (#1) 10 and is connected through the physical links PL3 and PL4 of the LAG to the carrier transmission apparatus (#3) 30, and includes the LTM frame extraction unit 21, the LTM frame receipt processing unit 22, the forward processing unit 23, the forwarding table 24, the output destination physical link identifying unit 25, the load distribution unit 26, the LTR frame generation unit 27, the multiplexing units 281 and 282, the LTM frame generation unit 29, and a load distribution control unit 31. Each function of the LTM frame extraction unit 21, the LTM frame receipt processing unit 22, the forward processing unit 23, the output destination physical link identifying unit 25, the load distribution unit 26, the LTR frame generation unit 27, the multiplexing units 281 and 282, the LTM frame generation unit 29, and the load distribution control unit 31 may be performed, for example, by a processor executing a program stored in a memory. And, the forwarding table 24 may be implemented as hardware, for example, by a memory.

In this carrier transmission apparatus 20, the LTM frame extraction unit 21 extracts an LTM frame based on a multicast address specially set for a link trace message in a frame received through the physical link PL2 from the transmission apparatus 10, and then transmits the extracted LTM frame to the LTM frame receipt processing unit 22.

Referring to the forwarding table 24 of the forward processing unit 23, the LTM frame receipt processing unit 22 searches for a forward destination (output destination) for the target MAC address carried in the received LTM frame. If, as a result of this search, it is determined that the route to the output destination passes through an LAG, then the LTM frame receipt processing unit 22 takes out trace target frame header information from the received LTM frame and transmits it to the output destination physical link identifying unit 25. The LTM frame receipt processing unit 22 also takes out the corresponding monitoring frame header information from the received LTM frame and transmits it to the load distribution control unit 31.

Using the same algorithm as the load distribution unit 26, the output destination physical link identifying unit 25 identifies one output destination physical link over which a frame containing in the frame top portion the same information as the trace target frame header information is to be forwarded. Then, the output destination physical link identifying unit 25 transmits information on the identified output destination physical link to the LTR frame generation unit 27 and the load distribution control unit 31.

Based on the corresponding monitoring frame header information received from the LTM frame receipt processing unit 22 and the output destination physical link information received from the output destination physical link identifying unit 25, the load distribution control unit 31 controls the load distribution unit 26 so that a frame containing the same header information as the monitoring frame header information is output to a physical link indicated by the output destination physical link information. That is, the load distribution control unit 31 instructs the load distribution unit 26 to add a new load distribution rule having a priority higher than that of the existing load distribution rule that is usually applied by the load distribution unit 26.

The LTR frame generation unit 27 is notified from the LTM frame receipt processing unit 22 that the LTM frame has been received, and receives the information on the output destination physical link from the output destination physical link identifying unit 25. Taking these opportunities, the LTR frame generation unit 27 generates an LTR frame that contains in the payload thereof an identifier of the output destination physical link (e.g., an identifier corresponding to the physical link (#3) PL3) and a reply node MAC address (the MAC address of the carrier transmission apparatus 20 here) and contains in the MAC header thereof a MAC destination address (the MAC address of the carrier transmission apparatus 10 here) and a MAC source address (the MAC address of the carrier transmission apparatus 20 here).

The generated LTR frame is transmitted (returned) through the multiplexing unit 281 over the physical link PL2 to the carrier transmission apparatus 10, which is the transmission source of the LTM frame.

The LTM frame generation unit 29 outputs to the multiplexing unit 282 the LTM frame that has been received from the LTM frame receipt processing unit 22 and in which the MAC source address of the MAC header has been rewritten into the MAC address of the carrier transmission apparatus 20, in order to transmit that LTM frame to the LAG, which is the forward destination corresponding to the target MAC address. The LTM frame from the multiplexing unit 282 is transmitted to the physical link PL3 identified based on the algorithm used in the load distribution unit 26.

The carrier transmission apparatus (#3) 30 serving as a relay node and the carrier transmission apparatus (#4) 40 serving as an exit edge node, which are each disposed downstream of the carrier transmission apparatus (#2) 20 in the carrier network NW, may be configured to have a function of processing a received LTM frame and returning an LTR frame through an upstream node to the carrier transmission apparatus (#1) 10, which is a node that has generated the LTM frame at the beginning.

Through the processes described above, the carrier transmission apparatus (#1) 10 is notified that the user communication frame of the link trace target is transmitted through the carrier transmission apparatuses (#2, #3, and #4) 20, 30, and 40, and that which physical link the user communication frame passes through between the carrier transmission apparatus (#2) 20 and the carrier transmission apparatus (#3) 30 where the LAG is formed.

FIG. 13 illustrates an example manner of adding a new load distribution rule in the carrier transmission apparatus (#2) 20 illustrated in FIG. 12.

Until receipt of an LTM frame, the load distribution unit 26 distributes the load to two physical links PL3 and PL4 in such a manner that a hash calculation of the header information of a user communication frame is performed, and the user communication frame is output to the physical link (#3) PL3 of the LAG when the hash value obtained as a result of calculation is 1, and is output to the physical link PL4 (#4) of the LAG when the hash value is 2, for example.

Under such a situation, it is supposed that the output destination physical link identifying unit 25 identifies the output destination physical link from the header information carried in the trace target frame header information of the LTM frame, and the result is the physical link (#3) PL3.

In this case, the corresponding delay monitoring frame is likewise to be output to the physical link (#3) PL3, and therefore the load distribution control unit 31 instructs the load distribution unit 26 to additionally set such a new load distribution rule that the delay monitoring frame containing the corresponding monitoring frame header information of the LTM frame is output to the physical link (#3) PL3. That is, the load distribution control unit 31 instructs the load distribution unit 26 to add a new load distribution rule having a priority (HIGH) higher than a priority (MEDIUM) of the exiting load distribution rule that is usually applied by the load distribution unit 26.

By adopting such a load distribution rule, control may be performed such that a user communication frame of service traffic whose transmission quality, such as delay, is desired to be monitored and a monitoring frame for monitoring the transmission quality, such as delay, pass through the same physical link of an LAG.

Modifications

The processing in any of the embodiments described above is provided as a program that is executable by a computer, and may be provided on a non-temporary computer-readable storage medium, such as a CD-ROM or a flexible disk, or via a communication line. The computer includes a processor and a memory, for example, and the processing in any of the embodiments described above may be implemented by a processor executing a program stored in the memory.

Some or all of the processing in any of the embodiments described above may be selected and performed in combination.

According to the disclosed frame transmission system, even when a link aggregation group including a plurality of physical links is formed, the transmission path of a user communication frame of service traffic (user MAC frame) may be accurately detected.

According to the disclosed frame transmission system, even when a link aggregation group including a plurality of physical links is formed, control may be performed such that a user communication frame of service traffic whose transmission quality is desired to be monitored and a monitoring frame for monitoring the transmission quality pass through the same physical link of a link aggregation group.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A frame transmission system, comprising:
a first frame transmission apparatus configured to transmit a message frame including an medium access control (MAC) destination address in a user MAC frame, and including both MAC header information and header information of an upper layer in the user MAC frame; and
a second frame transmission apparatus configured to:
receive the message frame,
select, using a first algorithm, a physical link from a plurality of physical links which are included in a link aggregation group,
transmit the message frame through the selected physical link to a third frame transmission apparatus,
identify, using the first algorithm, the physical link based on the MAC header information and the header information of the upper layer acquired from the message frame received from the first frame transmission apparatus,
wherein the second frame transmission apparatus is further configured to set, to a load distribution unit, a new load distribution rule based on the identified physical link information and corresponding monitoring frame header information, wherein the corresponding monitoring frame header information is used to control a user communication frame of a delay monitoring target and a delay monitoring frame, and
transmit a reply frame including information indicating the identified physical link and a MAC address of the second frame transmission apparatus to the first frame transmission apparatus.

2. The frame transmission system according to claim 1, wherein the user MAC frame includes at least one of a user MAC frame of which a transmission path is desired to be detected and a user MAC frame of which transmission quality is desired to be monitored.

3. The frame transmission system according to claim 1, wherein the frame transmission system is configured to transmit the user MAC frame and a transmission quality monitoring frame,
wherein the first frame transmission apparatus is configured to transmit the message frame including the MAC destination address in the user MAC frame of which the transmission quality is desired to be monitored, the MAC header information and the header information of the upper layer in the user MAC frame, and data for transmission quality monitoring in the transmission quality monitoring frame used for monitoring transmission quality of the user MAC frame, and
wherein the second frame transmission apparatus is further configured to additionally set, for transmission, a load distribution rule for outputting both the user MAC frame and the transmission quality monitoring frame to a same physical link corresponding to the identified physical link, based on information on the identified physical link, and the MAC header information and the data for the transmission quality monitoring.

4. The frame transmission system according to claim 3, wherein the second frame transmission apparatus is further configured to:
select, as the identified physical link, a physical link determined by using an algorithm that is used to identify an output destination, and
transmit the user MAC frame, the transmission quality monitoring frame, and the message frame.

5. The frame transmission system according to claim 1, wherein a given multicast address is set in a fixed manner as a MAC destination address of a MAC header of the message frame.

6. The frame transmission system according to claim 1, wherein a MAC source address of a MAC header of the message frame is rewritten from a MAC address of the first frame transmission apparatus into the MAC address of the second frame transmission apparatus.

7. The frame transmission system according to claim 1, wherein the first and second frame transmission apparatuses are layer 2 switches on an Ethernet network.

8. The frame transmission system according to claim 1, wherein the MAC header information and header information of an upper layer in user MAC frame information comprise trace target frame header information for link tracing.

9. The transmission system according to claim 8, wherein the MAC header information of the trace target frame header information comprises a MAC destination address corresponding to a target MAC address.

10. The transmission system according to claim 1, wherein the delay monitoring frame and the user communication frame of the delay monitoring target are to pass through a transmission path including the identified physical link.

11. A frame transmission apparatus, comprising:
a memory; and
a processor coupled to the memory and configured to:
receive, from a first frame transmission apparatus, a message frame including an medium access control (MAC) destination address in a user MAC frame, and including both MAC header information and header information of an upper layer in the user MAC frame,
select, using a first algorithm, a physical link from a plurality of physical links which are included in a link aggregation group,
transmit the message frame through the selected physical link to a second frame transmission apparatus,
identify, using the first algorithm, the physical link based on the MAC header information and the header information of the upper layer acquired from the message frame received from the first frame transmission apparatus,
wherein the processor is further configured to set, to a load distribution unit, a new load distribution rule based on the identified physical link information and corresponding monitoring frame header information, wherein the corresponding monitoring frame header information is used to control a user communication frame of a delay monitoring target and a delay monitoring frame, and
transmit a reply frame including information indicating the identified physical link and a MAC address of the frame transmission apparatus to the first frame transmission apparatus.

12. The frame transmission apparatus according to claim 11, wherein the user MAC frame includes at least one of a user MAC frame of which a transmission path is desired to be detected and a user MAC frame of which transmission quality is desired to be monitored.

13. The frame transmission apparatus according to claim 11,
wherein the processor is further configured to receive the message frame including the MAC destination address in the user MAC frame of which transmission quality is desired to be monitored, both the MAC header information and the header information of the upper layer, and MAC header information and data for transmission quality monitoring in a transmission quality monitoring frame used for monitoring transmission quality of the user MAC frame, and
wherein the processor is further configured to additionally set, for transmission, a load distribution rule for outputting both the user MAC frame and the transmission quality monitoring frame to a same physical link corresponding to the identified physical link, based on information on the identified physical link, and the MAC header information and the data for the transmission quality monitoring.

14. The frame transmission apparatus according to claim 13, wherein the processor is further configured to:
select, as the identified physical link, a physical link determined by using an algorithm that is used to identify an output destination, and
transmit the user MAC frame, the transmission quality monitoring frame, and the message frame.

15. The frame transmission apparatus according to claim 11, wherein a given multicast address is set in a fixed manner as a MAC destination address of a MAC header of the message frame.

16. The frame transmission apparatus according to claim 11, wherein a MAC source address of a MAC header of the message frame is rewritten into the MAC address of the frame transmission apparatus.

17. A frame transmission method, comprising:
receiving, at a second frame transmission apparatus, a message frame from a first frame transmission apparatus, the message frame including an medium access control (MAC) destination address in a user MAC frame, and including both MAC header information and header information of an upper layer in the user MAC frame;
selecting, using a first algorithm, a physical link from a plurality of physical links which are included in a link aggregation group,
transmitting the message frame through the selected physical link to a third frame transmission apparatus,
identifying, using the first algorithm, the physical link based on the MAC header information and the header information of the upper layer acquired from the message frame received from the first frame transmission apparatus,
wherein the second frame transmission apparatus is configured to set, to a load distribution unit, a new load distribution rule based on the identified physical link information and corresponding monitoring frame header information, wherein the corresponding monitoring frame header information is used to control a user communication frame of a delay monitoring target and a delay monitoring frame, and
transmitting a reply frame including information indicating the identified physical link and a MAC address of the second frame transmission apparatus to the first frame transmission apparatus.

18. The frame transmission method according to claim 17, wherein the user MAC frame includes at least one of a user MAC frame of which a transmission path is desired to be detected and a user MAC frame of which transmission quality is desired to be monitored.

19. The frame transmission method according to claim 17, wherein the receiving includes receiving the message frame including the MAC destination address in the user MAC frame of which transmission quality is desired to be monitored, both MAC header information and header information of an upper layer in the user MAC frame, and MAC header information and data for transmission quality monitoring in a transmission quality monitoring frame used for monitoring transmission quality of the user MAC frame, and further comprising:

additionally setting, for transmission, a load distribution rule for outputting both the user MAC frame and the transmission quality monitoring frame to a same physical link corresponding to the identified physical link, based on information on the identified physical link, and the MAC header information and the data for the transmission quality monitoring.

20. The frame transmission method according to claim 19, further comprising:

selecting, as the identified physical link, a physical link determined by using an algorithm that is used to identify an output destination; and transmitting the user MAC frame, the transmission quality monitoring frame, and the message frame.

* * * * *